No. 685,182. Patented Oct. 22, 1901.
E. G. SHORTT.
AIR BRAKE VALVE MECHANISM.
(Application filed Sept. 18, 1899.)
(No Model.) 6 Sheets—Sheet 3.
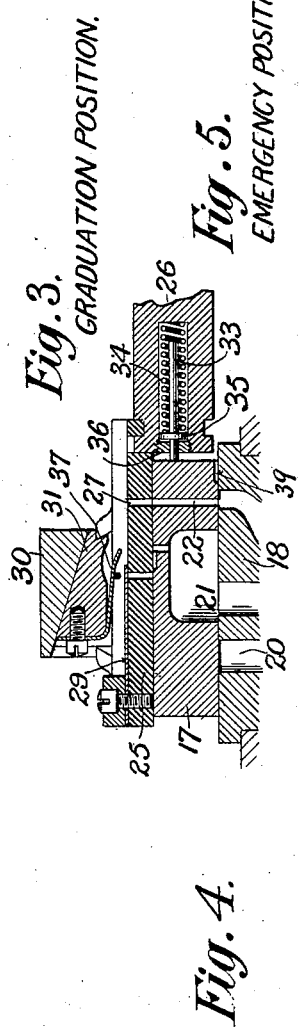
Fig. 3. GRADUATION POSITION.
Fig. 5. EMERGENCY POSITION.
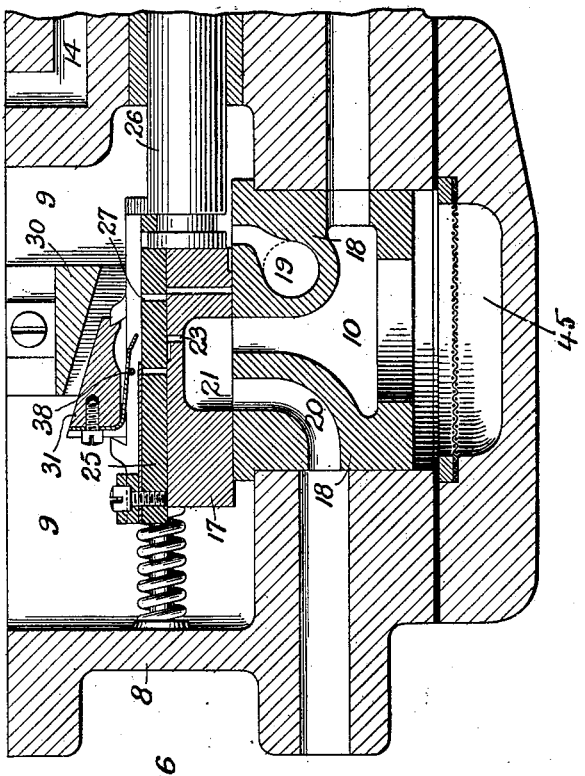
Fig. 4.
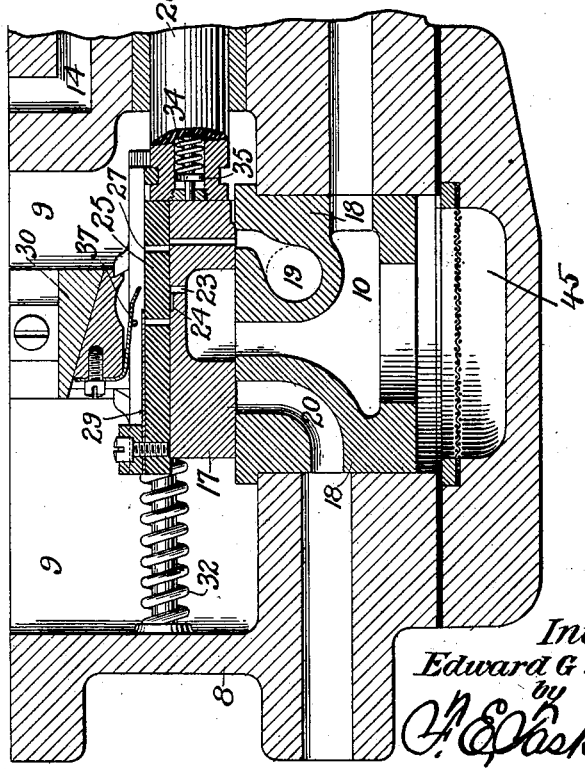
Witnesses:
James F. Duhamel
J. S. Cadel
Inventor:
Edward G. Shortt
by
N. E. Oaker, Att'y No. 685,182. Patented Oct. 22, 1901.
E. G. SHORTT.
AIR BRAKE VALVE MECHANISM.
(Application filed Sept. 13, 1899.)
(No Model.) 6 Sheets—Sheet 4.
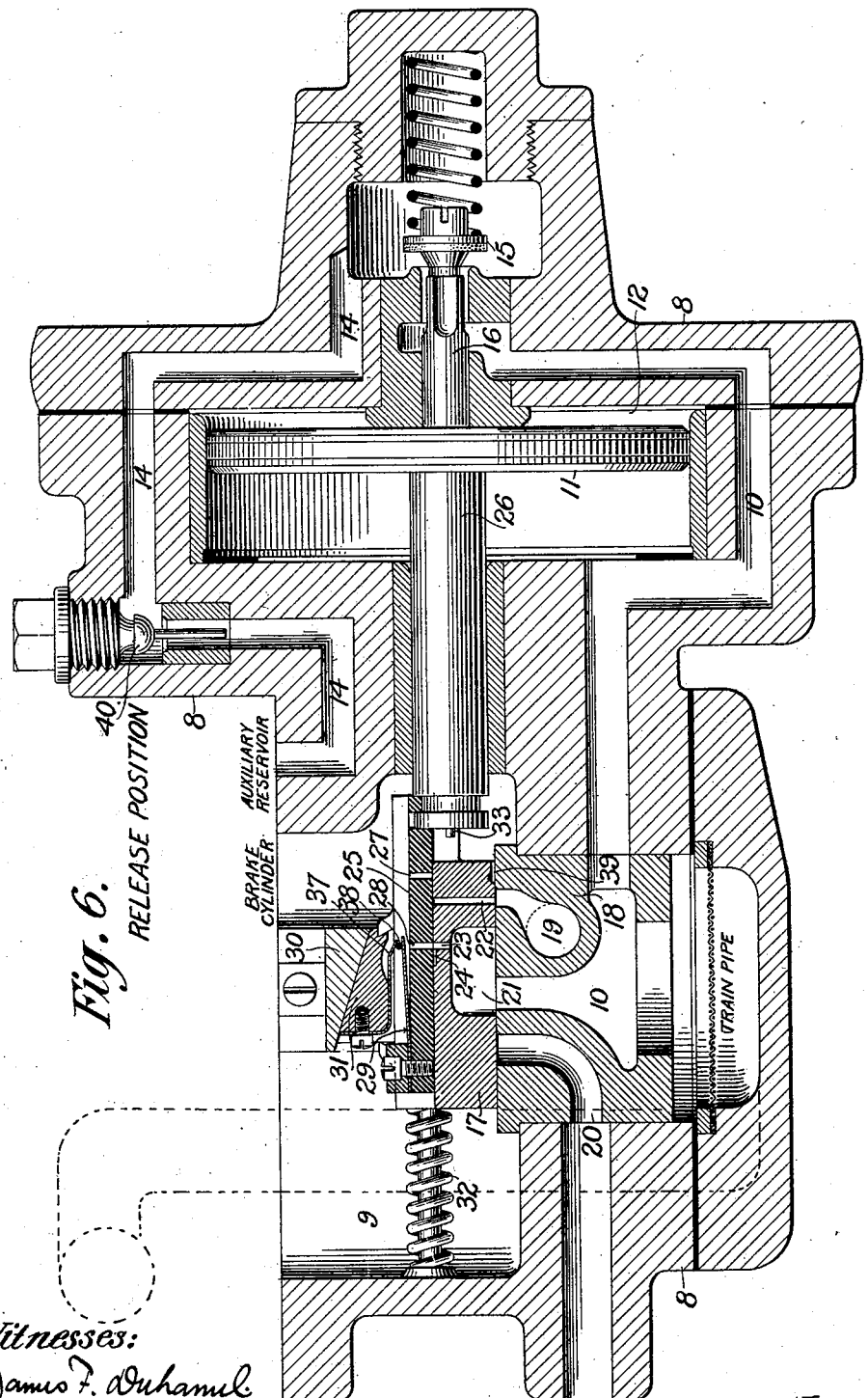
Fig. 6. RELEASE POSITION
Witnesses:
James F. Duhamel
J. S. Cadel
Edward G. Shortt, Inventor
by Fred B. Tasker, Att'y.
THE NORRIS PETERS CO., PHOTO-LITHO., WASHINGTON, D. C.

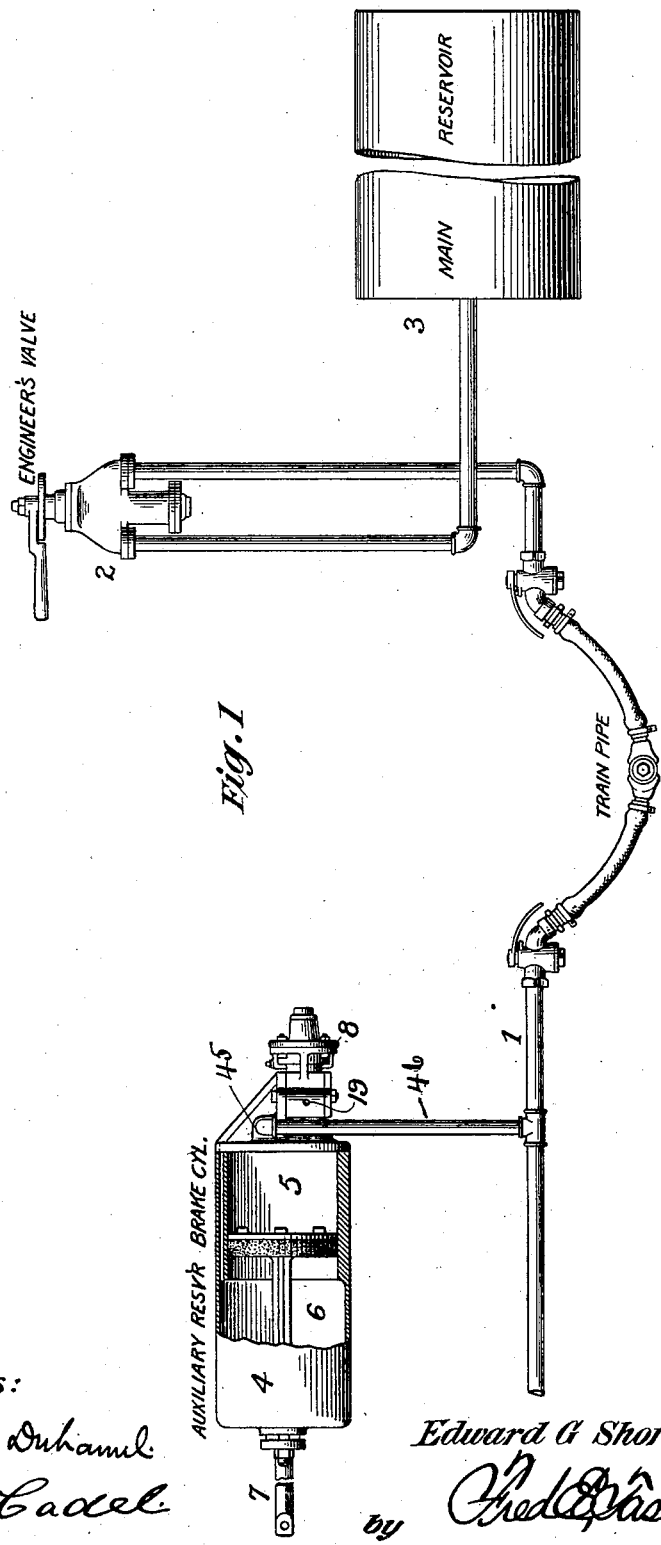

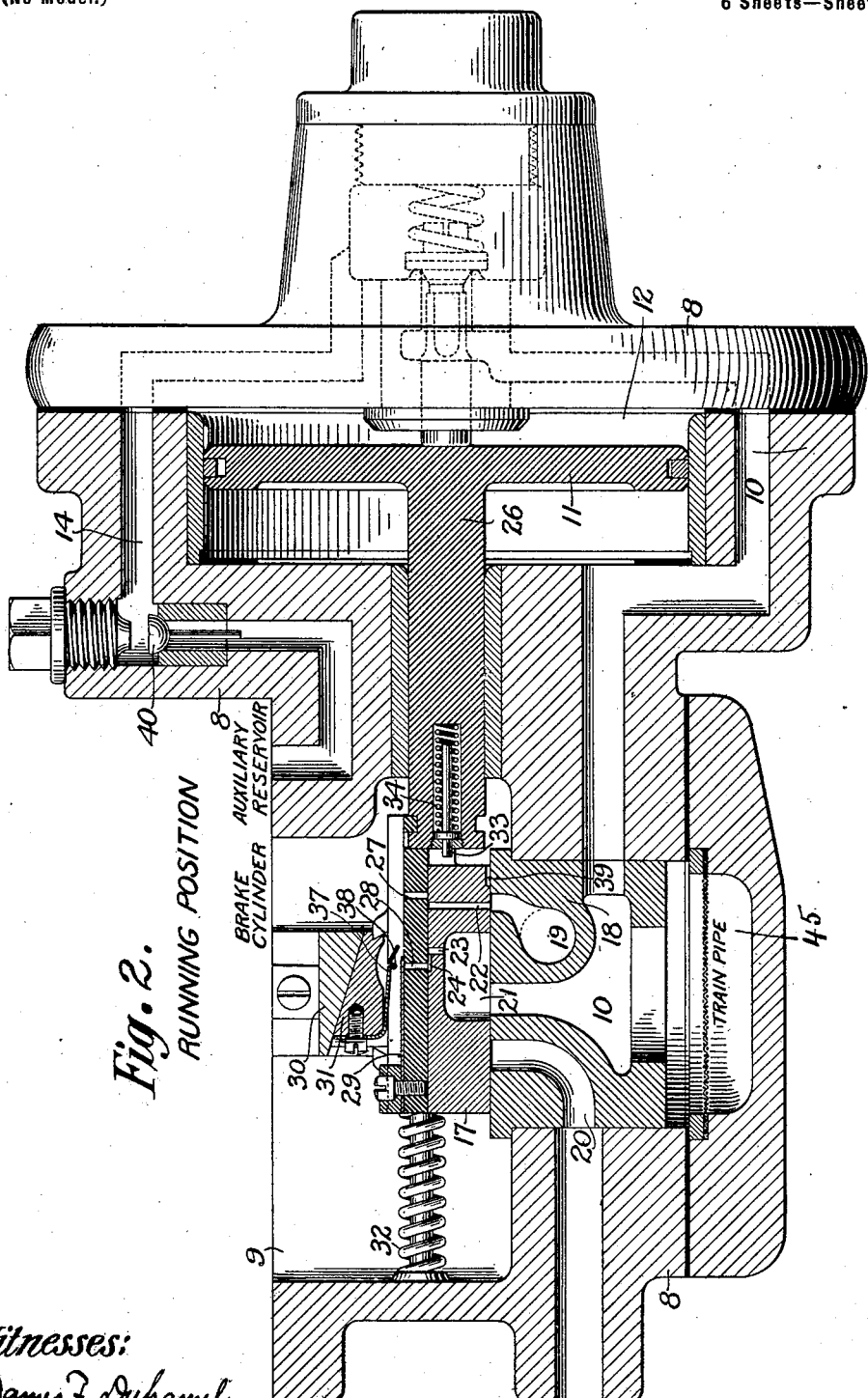

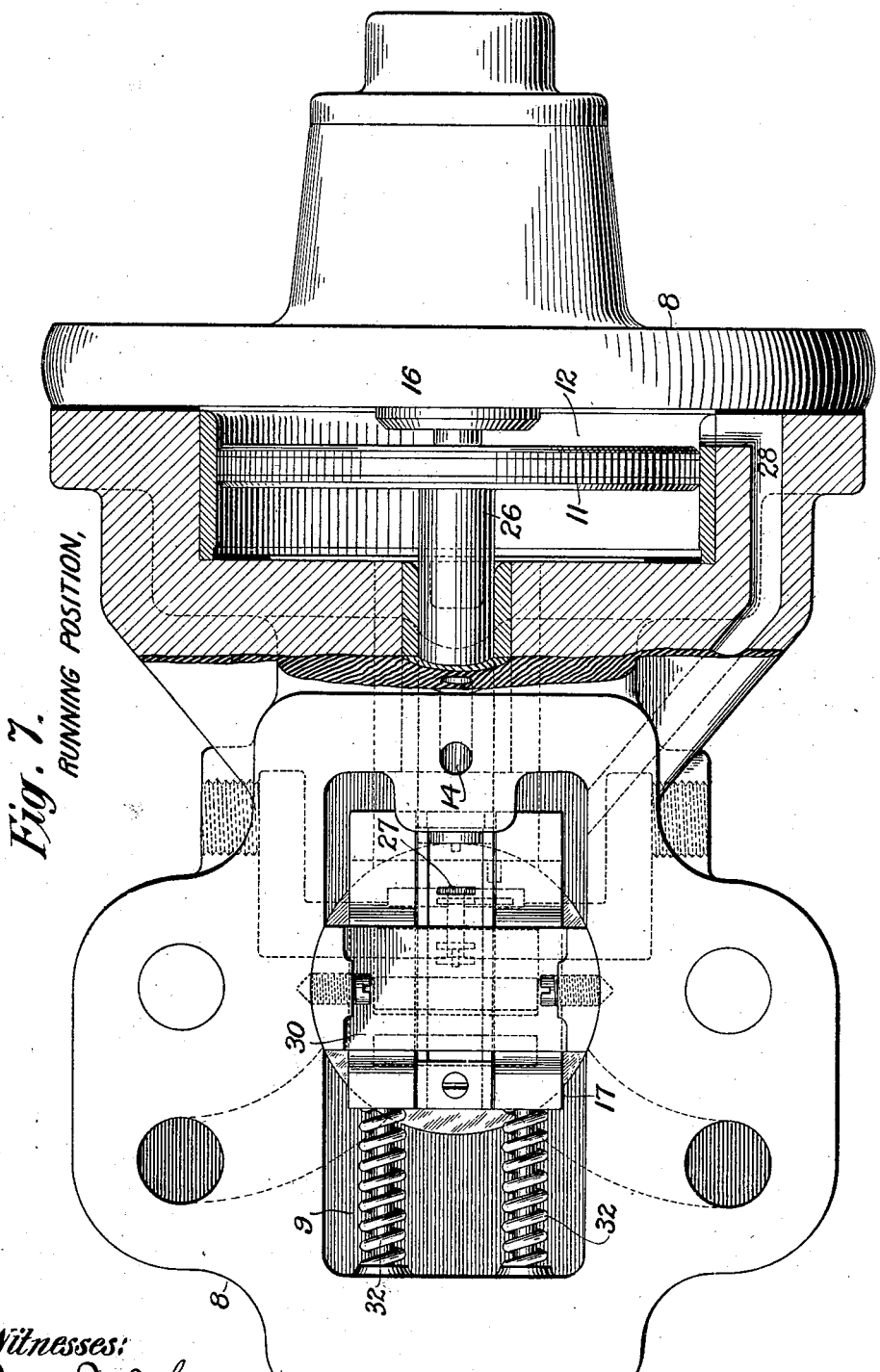

No. 685,182. Patented Oct. 22, 1901.
E. G. SHORTT.
AIR BRAKE VALVE MECHANISM.
(Application filed Sept. 13, 1899.)
(No Model.) 6 Sheets—Sheet 6.
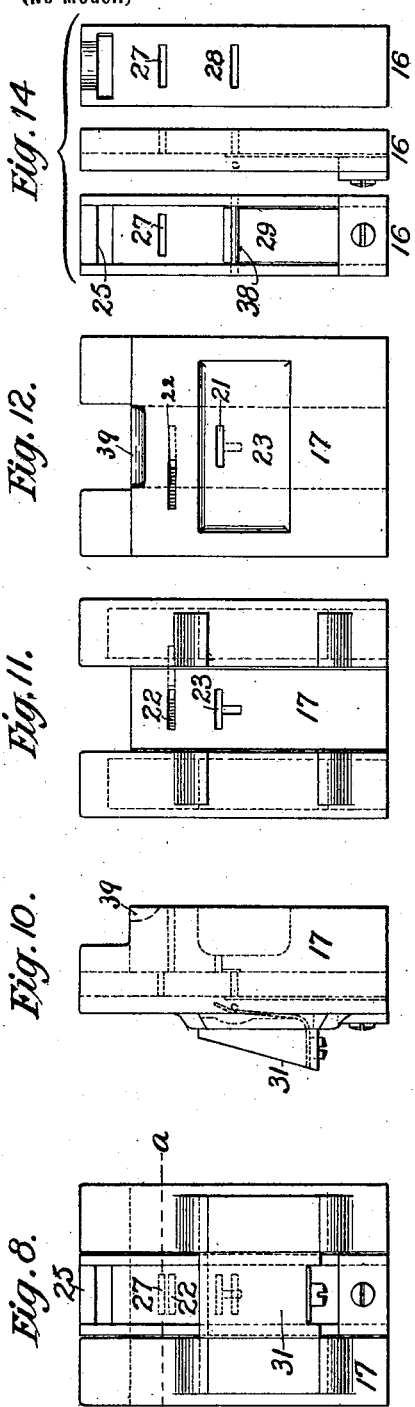
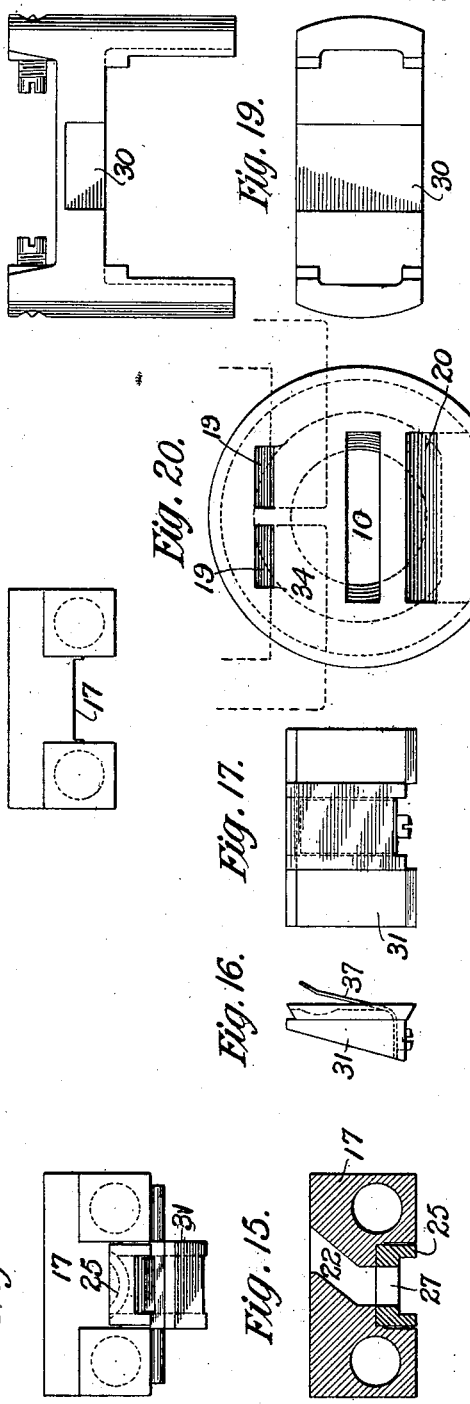
Witnesses:
James F. Duhamel
J. S. Cadel
Edward G. Shortt, Inventor
by Fred E. Tasker, Atty
THE NORRIS PETERS CO., PHOTO-LITHO., WASHINGTON, D. C.

UNITED STATES PATENT OFFICE.

EDWARD G. SHORTT, OF CARTHAGE, NEW YORK, ASSIGNOR TO THE INTERNATIONAL AIR BRAKE COMPANY, OF JERSEY CITY, NEW JERSEY, A CORPORATION OF NEW JERSEY.

AIR-BRAKE VALVE MECHANISM.

SPECIFICATION forming part of Letters Patent No. 685,182, dated October 22, 1901.

Application filed September 13, 1899. Serial No. 730,298. (No model.)

*To all whom it may concern:*

Be it known that I, EDWARD G. SHORTT, a citizen of the United States, residing at Carthage, in the county of Jefferson and State of New York, have invented certain new and useful Improvements in Air-Brake Valve Mechanism, of which the following is a specification.

The present improvements relate generally to that class of invention known as "fluid brake mechanisms," and particularly they relate to the subdivision of the general class designated "equilibrio air-brakes," a sample of which is found in my former United States Letters Patent, No. 538,552, dated April 30, 1895.

The leading features of the present improvements, among others which might be mentioned, consist of means whereby better or enhanced results are obtained in respect of accuracy and speed in producing graduation and emergency action and in an increased range of definition between these actions and in the release action; means whereby a surer or more certain emergency action is secured, especially in the case of long trains, and the provision of separate exhaust-ports for the cylinder-exhaust and the train-pipe exhaust instead of having the cylinder-exhaust pass first into the train-pipe and then through the train-pipe exhaust-port, the exhaust-port of the cylinder in this latter case not being independent of the exhaust-port of the train-pipe, a construction which is shown in my said Letters Patent already referred to.

The apparatus illustrated and described in this application will be found already explained to a large extent as to many of its details of construction and operation in the said Letters Patent, and therefore I shall make the description in the present case correspondingly brief, confining it mainly to the matters and things pertaining to my present improvements and to the operations and mechanical features that differ from those of the mechanism of the said Letters Patent, while I shall endeavor to describe enough of the air-brake valve mechanism of the previous invention to make my meaning entirely clear and adequate for the understanding of those skilled in the art to which the invention pertains. Under one aspect of the case, therefore, it may be considered that the present invention while an improvement in the art is more particularly an improvement upon the valve mechanism delineated and explained in my previous Letters Patent just referred to.

In addition to the leading features of which the present invention consists it may be said that it also comprises numerous details in the construction, arrangement, and combination of parts substantially as will be hereinafter described and then more definitely pointed out in the ensuing claims.

In the accompanying drawings, illustrating my invention, Figure 1 is a general diagrammatic view of an air-brake mechanism embodying my present improvements. Fig. 2 is a central vertical section of the valve mechanism, the movable parts being shown in the position that they occupy when the apparatus is in the position known as "running" position. Fig. 3 is a similar section with the said parts occupying graduation position. Fig. 4 is a similar section with the said parts occupying the position that they assume when passing to emergency. Fig. 5 is a similar section with said parts occupying emergency position. Fig. 6 is a view like Fig. 2, except that the parts are in release position. Fig. 7 is a plan view, in partial section, of the valve mechanism, the parts being shown in running position. Fig. 8 is a rear elevation face view from the cylinder side of the emergency and graduation valves. Fig. 9 is an end view of the same. Fig. 10 is a side view of the same. Fig. 11 is a similar view of the emergency-valve standing alone, the graduation-valve being removed. Fig. 12 is a view of the same from the train-pipe side thereof. Fig. 13 is an end or plan view of the same. Fig. 14 represents a face view of the graduation-valve from the cylinder side thereof and a side view and a face view from the train-pipe side. Fig. 15 is a cross-section on the line *a a* of Fig. 8. Figs. 16 and 17 are an end and a plan view, respectively, of the wedge-block carried by the emergency-valve. Figs. 18 and 19 are an elevation and a plan view, respectively, of a bridge-piece or emergency-valve-seating device. Fig. 20 shows the emergency-valve seat as seen on the cylinder side.

Similar numerals of reference designate corresponding parts through all the different figures of the drawings.

1 denotes the train-pipe; 2, the engineer's valve; 3, the main reservoir; 4, the auxiliary reservoir; 5, the brake-cylinder; 6, the brake-piston and 7 its rod; 8, the main valve.

The train-pipe 1 has a branch 46, which enters the valve-body 8 at a point 45, (see Figs. 2, 4, and 5,) so that train-pipe air is delivered to the valve mechanism at this point.

Although my former Letters Patent, No. 538,552, is referred to for the purpose of showing a mechanism on which the present invention is an improvement, yet for the purpose of particularly indicating the construction and arrangement of the brake-cylinder and the auxiliary-reservoir structures, such as are outlined herein, I refer also to my other United States Letters Patent, No. 538,547, dated April 30, 1895, in which such structures are illustrated and described in detail.

The casing of the valve 8 is secured in some suitable way to the brake-cylinder 5, as shown in Fig. 1. The connection of said valve with the cylinder is made at the point 9, and this numeral designates the cylinder-space in the valve and also a passage leading from the cylinder to the upper or rear face of the graduation and emergency valves. The train-pipe space 10 is situated below these graduation and emergency valves and it leads under the valve-actuating piston 11, on the other side of which piston is a cylinder-space 12, which connects with the other cylinder-space 9 through a passage 28, as shown in Fig. 7. A passage or port 14 runs from the auxiliary reservoir to the reservoir storage-valve 15, which is adapted to put said passage 14 in communication with the train-pipe space 10, this communication being brought about by the lifting of the reservoir-valve 15 from its seat through the contact of its stem 16 with the valve-actuating piston 11 at the time of release action. In the passage 14 is also located the retaining or check valve 40, acting under flow of air from the reservoir to open the passage 14, but closing it as to the flow of air to the reservoir.

17 indicates the emergency-valve. This is in contact with a seat-piece 18, which is suitably fitted in the casing of the main-valve mechanism and contains a portion of the train-pipe space 10, as well as other ports and passages, as will be presently set forth, the principal being the cylinder exhaust-port 19 and the train-pipe exhaust-port 20. The valve 17 has a train-pipe exhaust-passage 21, a graduation exhaust-passage 22, an air-charging passage 23, and a feed-passage 24.

25 denotes a graduation-valve which is connected to the rod or stem 26 of the piston 11 and which slides in a groove on the upper or cylinder side of the emergency-valve, as shown in Fig. 8. The graduation-valve 25 has a graduation-passage extending transversely through the same, a feed-passage 28, and a feed-passage valve 29, the latter consisting of a flat or leaf spring which is secured to the rear face of the graduation-valve 25, near one end thereof, by means of a retaining-screw or other similar fastening device. A wedge-shaped bridge-piece 30 has the function of holding the emergency-valve closely upon its seat 18 by the engagement with said emergency-valve of the correspondingly-shaped bevel-block 31, carried by the emergency-valve. Said emergency-valve is of plate-like form and is furnished with springs 32 for returning it to the running position after an emergency action has been had. The springs 32 surround pins or rods which are fastened at one end to the valve-body 8, while their opposite ends engage orifices in the emergency-valve 17, which orifices are shown in Fig. 15, so that in going to the emergency position the valve slides on the said rods or pins and compresses the springs, which latter expand when the valve 17 is restored to its running position.

33 indicates a spring-provided stem projecting centrally from a recess or interior bore in the end of the piston rod or stem 26, said stem 33 being held normally in its projected position, as shown in Figs. 3 and 6, by means of a spring 34, which bears against the inner end of the said interior bore, and a fixed disk 35, carried by the stem 33, which disk 35 rests against the apertured plug 36, that is threaded for the purpose of enabling it to be secured in the end of and thus close the said interior bore of the piston-rod 26. The projecting portion of the said stem 33 is of such a length that when the valve-actuating piston 11 is moved to effect graduation action it will strike against the emergency-valve 17 (see Fig. 3) at the same time that the graduation-passages 22 and 27 are so positioned that they will come into registry with each other, as shown in Fig. 3, for the purpose of placing the cylinder-space 9 in open communication with the cylinder exhaust-port 19. Also the projected part of said stem 33 is of such a length that when the valve-actuating piston 11 is acted upon to produce an emergency action, and thereby the spring 34 is compressed and the end of the piston-rod 26 brought into contact with the emergency-valve 17 by a throwing of the graduation-valve 25 beyond the position shown in Fig. 3, so that it will lie as represented in Figs. 4 and 5, the graduation-passage 27 will have moved to a position beyond the graduation-passage 22, thereby closing the latter.

The wedge-block 31 carries a spring 37, which bears upon a cross-bar or pin 38, mounted in the graduation-valve 25. Said spring 37 is bent abruptly at its free end in such a manner that when the graduation-valve is in a position of release, as shown in Fig. 6, this spring will for the main part of its length have been brought in contact with the under side of said wedge 31 and the said bar or pin 38 brought in contact with the bent end thereof. It will be seen, therefore, that during all movements of the graduation-valve, except that of release, the said spring acts upon the bar 38 with the pressure represented by its full length, but that at the time of release the spring is shortened as to its effective length, and therefore puts a greater pressure upon the said bar than at any other time of its action. The purpose of this is to strongly hold the graduation-valve to its seat upon the emergency-valve at the time of release and when air from the train-pipe and auxiliary reservoir is rushing through the charging-passages 23 and 28 into the then empty cylinder-space. It is thus assured that the graduation-valve will not be lifted from its seat, which, if it should happen, would permit the recharging air to escape through the graduation-passage 22 in the emergency-valve and to the cylinder exhaust-port 19. This holding of the graduation-valve at the time of release is important to insure prompt and certain release action, especially in the case of long trains of the maximum number of cars.

The emergency-valve is provided with a vent-port 39, consisting of an incut groove at the valve-piston end of said valve and running toward the graduation-port 22 and so located and of such an extent that at the time of said valve returning from application position to running position the cylinder-space will be in communication with the exhaust-port 19 until the valve has become seated. Thus as the said valve is returned to running position the graduation-valve carried thereby will be held in position practically as seen in Fig. 3, or with its graduation-passage in registry with the graduation-passage of the emergency-valve. During this movement so long as the graduation-passage is held closed by the valve-seat 18 the said vent-passage 39 is in communication with the said port 19, (see Fig. 5;) but at the time that the graduation-passage 22 begins to open to the said port 19 the said vent-passage 39 is being closed by the valve-seat.

One of the essential purposes of the spring-stem 33 in the valve-piston rod is to insure certain emergency action, especially in the case of long trains. This emergency action is mainly dependent upon the certain and defined variation between cylinder-pressure on one side of the valve-piston and train-pipe pressure on the other side thereof, and therefore it is important that so far as possible communication between the cylinder and train-pipe space should not exist. At the same time provision must be made for accurate and certain graduation action. In the case of emergency action, therefore, this spring-stem yields to permit the valve-piston rod to come in contact with the emergency-valve to move the stem, and at the same time the graduation-passages are caused to pass each other and remain closed throughout the stroke or movement of the emergency-valve. In other words, though the graduation-passages are momentarily opened to the exhaust-port they are immediately closed and so remain during the movement of the emergency-valve, which prevents any appreciable escape of cylinder-air before the emergency-valve has reached its full exhaust position. As to the use of this spring-stem in the case of graduation action, to secure regular and certain graduation action the cylinder-air, acting upon the valve-piston, should have active preponderance until the cylinder is exhausted to a pressure corresponding to the train-pipe reduction of pressure. At the same time the valve-piston should be held air-tight in its chamber, which of course means friction and resistance against slight variations between cylinder and train-pipe pressures and also means essential variation between the actions of valve-pistons on different cars, as in the case of a sticky or unoiled piston and one which is oiled or otherwise free in its capacity of movement. Thus it is that one valve-piston may have full graduation movement with a certain train-pipe reduction, while another may not have effective motion or may have only a partial movement, and hence one car might receive the desired graduation-braking and another car no brake action or only part of the braking action desired. To compensate or offset these conditions, which in the ordinary air-brake mechanism militate against regular and certain graduation action, the spring in the valve-piston stem is made to have a tension or resistance approximately about the same as the average resistance of the valve-pistons in their chambers. It will be seen, therefore, that in the case of a free-moving valve-piston it will be stopped by such a stem when it has reached full graduation position, and if it be so free in its movement as to exhaust air disproportionately to the other valves of the train then the spring would yield and the graduation-passage would be more or less closed, while variations between train-pipe and cylinder pressures that could effect such an action would be all sufficient to cause other pistons having greater resistance against movement to be brought to full graduation position. In this same connection it will be observed that the tension of the stem-spring acts to prevent the piston-rod coming into such forcible contact with the emergency-valve as to start the same. In my said Patent No. 538,552 the cylinder-exhaust is into the train-pipe and then through the train-pipe exhaust-port. While this method of exhaust and this construction of valve is practicable, it is not so certain, especially in the case of long trains, as is the method and construction of separate exhaust-ports shown and described herein. One of the most desirable features of action in efficient braking is that of securing as nearly as possible simultaneous action of all the brakes on the train, or, in other words, to have as many brakes apply at once as is possible instead of having the brakes apply one after the other or in continuous sequence. To accomplish this result to a greater extent than has been done heretofore, I make the exhaust-port of the cylinder independent of the exhaust-port of the train-pipe. In this connection upon emergency action I wholly sever communication between train-pipe and cylinder and before the valve has started to move, first by the closure of the feed-passage valve and next by the movement of the graduation-valve, so that the graduation-port is is closed. This insures that during the movement of the emergency-valve no air will be leaking into the train-pipe space to interfere with the emergency-wave reduction. This separation of the exhaust-ports also permits me to make the train-pipe port large, compared with the cylinder-port, so that the emergency-wave reduction will be certainly continued throughout the whole train-pipe line. Also without interfering with the desired train-pipe exhaust I am permitted to employ a relatively small cylinder exhaust-port and to regulate the same at will.

Having thus described my invention, what I claim as new, and desire to secure by Letters Patent, is—

1. In combination, in a fluid-brake mechanism, and with the brake-cylinder and train-pipe thereof, a valve mechanism controlling an exhaust-port from the train-pipe and a separate exhaust-port from the cylinder and the graduation-valve of said mechanism controlling a graduation-passage opening into said cylinder-port, the valve mechanism being operated by variation between cylinder and train-pipe pressures, a piston for operating said valves and directly connected to the graduation-valve, and means for exerting a pressure upon the valves.

2. In a valve mechanism, and in combination with the graduation and emergency valves thereof, a piston-rod and piston for operating said valves and directly connected to the graduation-valve, and a yielding or spring part between said rod and the emergency-valve permitting the graduation-passage of the graduation-valve to pass or lap its exhaust-passage.

3. In a valve mechanism, and in combination with the graduation and emergency valves thereof, a piston-rod and piston for operating said valves and directly connected to the graduation-valve, and a yielding or spring part between said rod and the emergency-valve permitting the graduation-passage of the graduation-valve to pass or lap an exhaust-passage through the emergency-valve.

4. In a valve mechanism, and in combination with the graduation and emergency valves thereof, means for operating said graduation-valve relatively to the other valve for the purpose of producing graduation application, and means acting to permit said graduation-valve to pass or lap its exhaust-port to stop graduation action.

5. In a fluid-brake valve mechanism, the combination with the brake-cylinder and train-pipe; of a valve controlling an exhaust-passage from the train-pipe to the atmosphere, and also controlling a separate exhaust-passage from the cylinder to the atmosphere, said valve having a train-pipe exhaust-passage, a graduation exhaust-passage, and a feed-passage; and a graduation-valve having a graduation-passage, a feed-passage, and a feed-passage valve.

6. In a fluid-pressure brake mechanism, the combination with the brake-cylinder and train-pipe; of a valve controlling an exhaust-passage from the train-pipe to the atmosphere, and also controlling an independent or separate exhaust-passage from the cylinder to the atmosphere, said valve having a train-pipe exhaust-passage, a graduation-passage, an air-charging passage, a feed-passage, and a vent-port; and a graduation-valve, having a graduation-passage, a feed-passage, and a feed-passage valve.

7. In combination, in fluid-brake valve mechanism, and with the brake-cylinder and train-pipe thereof, a valve controlling an exhaust-passage from the train-pipe to the atmosphere, and also controlling an independent or separate exhaust-passage from the cylinder to the atmosphere, said valve having a vent-port to keep the valve-chamber in communication with the cylinder-exhaust until the valve has become seated when returning from application position to running position, and a graduation-valve having a graduation-passage, a feed-passage, and a feed-passage valve.

8. In a fluid-pressure brake mechanism, the combination with the brake-cylinder and train-pipe; of a valve controlling an exhaust-passage from the train-pipe to the atmosphere, and also controlling a separate exhaust-passage from the cylinder to the atmosphere, said valve having a train-pipe exhaust-passage, a graduation exhaust-passage, and a feed-passage; and a graduation-valve having a graduation-passage, a feed-passage, and a feed-passage valve, said graduation-valve being situated in a groove of the emergency-valve, and a wedge-block having a spring device bent at its free end and bearing on a pin in the graduation-valve.

9. In combination, in a fluid-brake valve mechanism, a slide-valve controlling an exhaust-passage from the train-pipe to the atmosphere, and also controlling a separate exhaust-passage from the cylinder to the atmosphere, and a graduation-valve situated in contact with the slide-valve and operating in connection therewith, the operation of the valves being effected by a variation of train-pipe pressure to open and close the proper passages or ports, and means for exerting a pressure upon the valves.

10. In a fluid-pressure brake mechanism, the combination with the brake-cylinder and train-pipe; of a valve controlling an exhaust-passage from the train-pipe to the atmosphere, and also controlling an independent or separate exhaust-passage from the cylinder to the atmosphere, a graduation-valve arranged in connection with the aforesaid valve, and the wedge devices arranged to exert a pressure upon the valves and having a spring bent at its free end and bearing on a pin in the graduation-valve.

11. In a valve mechanism, and in combination with the valve controlling an exhaust-port from the train-pipe and also controlling an independent or separate exhaust-port from the cylinder, and a graduation-valve situated in a groove of the first-named valve, a piston-rod and piston for operating said valves and directly connected to the graduation-valve, and a yielding or spring part between said rod and the emergency-valve to prevent the emergency-valve from starting prematurely or irregularly in the case of a movement of said piston-rod.

12. In a fluid-pressure brake mechanism, the combination with the brake-cylinder, auxiliary reservoir and train-pipe, of a valve controlling an exhaust-passage from the train-pipe to the atmosphere, and also controlling an independent or separate exhaust-passage from the cylinder to the atmosphere, a graduation-valve arranged to operate in conjunction with the aforesaid valve, a piston-rod and piston for operating the valves and directly connected to the graduation-valve, and a yielding or spring part between said rod and the emergency-valve permitting the graduation-passage of the graduation-valve to pass or lap an exhaust-passage through the emergency-valve.

In testimony whereof I affix my signature in presence of two witnesses.

EDWARD G. SHORTT.

Witnesses:
  MILTON CARTER,
  E. D. EAMES.